(12) United States Patent
Nada et al.

(10) Patent No.: US 8,874,321 B2
(45) Date of Patent: Oct. 28, 2014

(54) DISPLAY CONTROL APPARATUS FOR VEHICLE

(71) Applicant: DENSO CORPORATION, Kariya (JP)

(72) Inventors: Toru Nada, Inazawa (JP); Kiyotaka Taguchi, Kariya (JP); Makoto Manabe, Chiryu (JP); Shinji Hatanaka, Okazaki (JP); Norio Sanma, Okazaki (JP); Akira Yoshizawa, Koganei (JP); Makoto Obayashi, Kashiwa (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/848,131

(22) Filed: Mar. 21, 2013

(65) Prior Publication Data

US 2013/0282240 A1    Oct. 24, 2013

(30) Foreign Application Priority Data

Mar. 22, 2012    (JP) .................................. 2012-65587

(51) Int. Cl.
*B60K 37/06*    (2006.01)
*G06F 19/00*    (2011.01)

(52) U.S. Cl.
USPC .................... 701/42; 701/36; 348/148

(58) Field of Classification Search
CPC .................. B60K 2350/928; B60K 2350/352; B60K 2350/405; B60K 2350/407; B60K 37/06; B60Q 1/0082
USPC ........... 701/42, 1, 36; 348/148; 340/438, 459, 340/456, 932.2
See application file for complete search history.

(56) References Cited

U.S. PATENT DOCUMENTS

| | | | | |
|---|---|---|---|---|
| 7,605,693 | B2 * | 10/2009 | Kulas ............................ | 340/438 |
| 7,679,495 | B2 * | 3/2010 | Beutnagel-Buchner et al. ............................ | 340/435 |
| 8,013,723 | B2 * | 9/2011 | Kawachi ...................... | 340/438 |
| 2002/0067366 | A1 | 6/2002 | Hirao et al. | |
| 2007/0194899 | A1 * | 8/2007 | Lipman ......................... | 340/456 |
| 2008/0224840 | A1 | 9/2008 | Kawachi | |
| 2009/0128317 | A1 | 5/2009 | Hideshiro | |
| 2011/0030502 | A1 * | 2/2011 | Lathrop ......................... | 74/552 |

FOREIGN PATENT DOCUMENTS

| | | |
|---|---|---|
| JP | 11-314538 A | 11/1999 |
| JP | 2005-112050 A | 4/2005 |
| JP | 2006-264615 A | 10/2006 |
| JP | 2009-057013 A | 3/2009 |
| JP | 2010-120531 A | 6/2010 |
| JP | 2010-269756 A | 12/2010 |
| JP | 2011-063103 A | 3/2011 |
| JP | 2011-157992 A | 8/2011 |

* cited by examiner

Primary Examiner — Tan Q Nguyen
(74) Attorney, Agent, or Firm — Posz Law Group, PLC

(57) ABSTRACT

A display control apparatus for a vehicle includes a steering angle detector, an operation detector, a display section, and a setting section. The steering angle detector detects a steering angle of the vehicle. The operation detector detects an operation to an operation unit mounted on a steering wheel of the vehicle. The display section displays an operation image on a display unit located behind the steering wheel in such a manner that the operation image changes according to the operation detected by the operation detector. The setting section sets a display position of the operation image on the display unit according to the steering angle detected by the steering angle detector so that a driver of the vehicle views the operation image at a position adjacent to the operation unit.

22 Claims, 5 Drawing Sheets

DISPLAY CONTROL APPARATUS FOR VEHICLE

CROSS REFERENCE TO RELATED APPLICATION

This application is based on Japanese Patent Application No. 2012-65587 filed on Mar. 22, 2012, the contents of which are incorporated herein by reference.

FIELD

The present disclosure relates to a display control apparatus for displaying an image on a display unit mounted on a vehicle.

BACKGROUND

A vehicle is equipped with many on-board apparatus such as an audio apparatus and a navigation apparatus. In recent years, such on-board apparatus have become sophisticated, multifunctional, and communicable with an information terminal such as a smartphone. The on-board apparatus and the smartphone have various types of functions. To use the functions, a user needs to view an operation unit and/or a display unit and performs complicated operations. When a driver engages in such activities while driving a vehicle, these activities often draw the driver's eyes away from the front of the vehicle and/or take the driver's hands off a steering wheel, thus distracting the driver.

In a known technique, an operation to an on-board apparatus is received through an operation unit mounted on a steering wheel, and an operation image indicative of an operation state of the operation unit is displayed on a meter display unit located behind the steering wheel. According to this technique, while driving a vehicle, a driver can operate the on-board apparatus with his/her eyes on the meter display unit and with his/her hands on the steering wheel. Thus, the driver can operate the on-board apparatus without taking his/her eyes far off the front of the vehicle.

However, in the known technique, the operation image is displayed in a fixed position on the meter display unit. Therefore, if a position of the operation unit changes according to turn or rotation of the steering wheel, a distance between the operation image and the operation unit changes and becomes large. As a result, even when the driver looks at the operation image, the driver cannot know shortly the current operation state of the operation unit. Therefore, unless the driver looks at the operation image and the operation unit separately or the driver updates the operation image by actually operating the operation unit, it is difficult for the driver to recognize a positional relationship between his/or her finger and the operation unit. That is, the driver cannot intuitively operate the operation unit.

In a meter display system disclosed in US 2008/0224840 corresponding to JP-A-2008-221998, a display region where important information such as a vehicle speed is displayed on a meter display unit is moved or zoomed out according to an operation state of a steering wheel to prevent a steering wheel spoke from obstructing a driver's line of sight to the display region.

The meter display system disclosed in US 2008/0224840 may allow the driver to always view the important information, but does not allow the driver to intuitively operate the operation unit mounted on a steering wheel.

SUMMARY

In view of the above, it is an object of the present disclosure to provide a display control apparatus for allowing a driver of a vehicle to intuitively operate an operation unit mounted on a steering wheel of the vehicle.

According to a first aspect of the present disclosure, a display control apparatus for a vehicle includes a steering angle detector, an operation detector, a display section, and a setting section. The steering angle detector detects a steering angle of the vehicle. The operation detector detects an operation to an operation unit mounted on a steering wheel of the vehicle. The display section displays an operation image on a display unit located behind the steering wheel in such a manner that the operation image changes according to the operation detected by the operation detector. The setting section sets a display position of the operation image on the display unit according to the steering angle detected by the steering angle detector so that a driver of the vehicle views the operation image at a position adjacent to the operation unit.

According to a second aspect of the present disclosure, a display control apparatus for a vehicle includes a steering angle detector, an operation detector, a display section, and a setting section. The steering angle detector detects a steering angle of the vehicle. The operation detector detects an operation to an operation unit mounted on a steering wheel of the vehicle. The operating unit has a transparent portion through which a driver of the vehicle views a display unit located behind the steering wheel. The display section displays an operation image on the display unit in such a manner that the operation image changes according to the operation detected by the operation detector. The setting section sets a display position of the operation image on the display unit according to the steering angle detected by the steering angle detector so that the driver views the operation image through the transparent portion of the display unit.

BRIEF DESCRIPTION OF THE DRAWINGS

The above and other objects, features, and advantages will become more apparent from the following description and drawings in which like reference numerals depict like elements. In the drawings.

DETAILED DESCRIPTION

Embodiments of the present disclosure are described below with reference to the drawings.

(First Embodiment)

Figure 1:
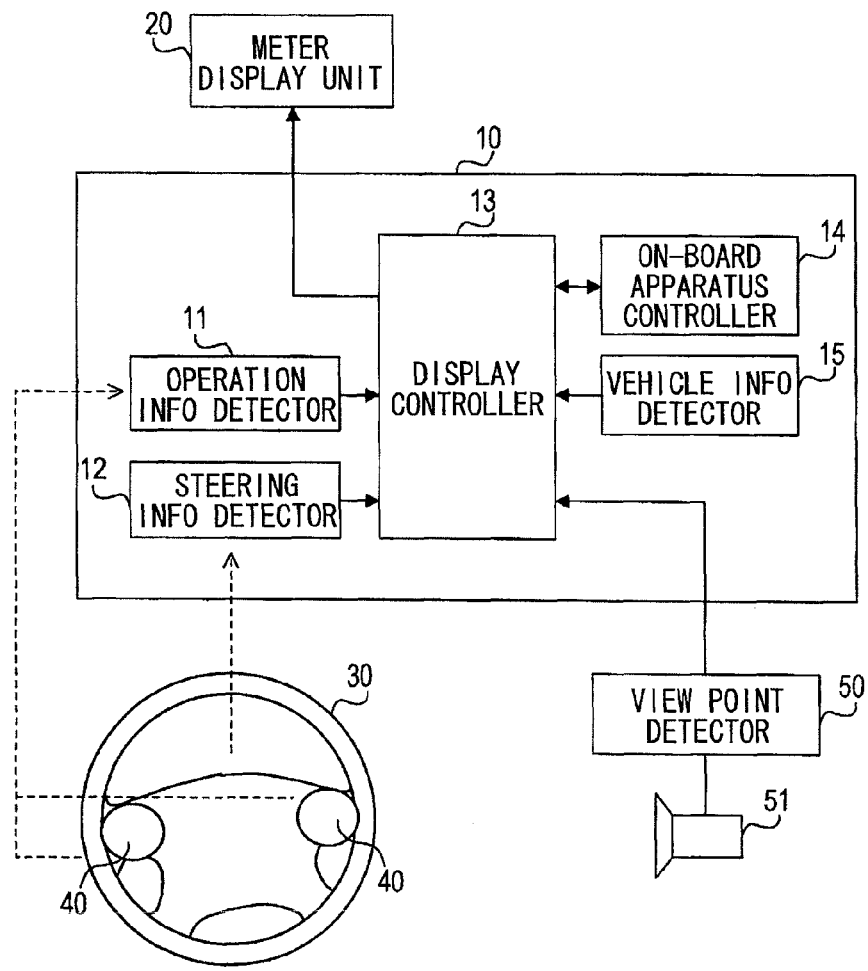
FIG. 1 is a block diagram of a display control apparatus according to a first embodiment of the present disclosure.

A display control apparatus 10 according to a first embodiment of the present disclosure is described below. Firstly, a structure of the display control apparatus 10 is explained with reference to FIG. 1.

The display control apparatus 10 is connected to a meter display unit 20 and two touch pads 40. The meter display unit 20 is located behind a steering wheel 30 of a vehicle with respect to a driver of the vehicle. The meter display unit 20 has a display screen and displays visual information, such as the current speed of the vehicle, on the screen. For example, the meter display unit 20 has a liquid crystal display screen. The touch pads 40 are mounted on the steering wheel 30 in such a manner that the driver can operate the touch pads 40 with his/her hands on the steering wheel 30.

Further, the display control apparatus 10 is connected to a view point detector 50 that detects a view point of the driver based on an image of the driver captured by a camera 51. Further, the display control apparatus 10 can be connected through an in-vehicle LAN (not shown) to other on-board apparatus mounted on the vehicle. Examples of the on-board apparatus can include a navigation apparatus and an air conditioner apparatus. Alternatively, the display control apparatus 10 can be integrated together with the on-board apparatus such as a navigation apparatus into one apparatus.

The display control apparatus 10 includes an operation information detector 11 and a steering information detector 12. The operation information detector 11 communicates with each touch pad 40 to acquire operation information. The steering information detector 12 acquires steering wheel information and steering angle information from sensors mounted on the vehicle. The steering wheel information indicates a set position of the steering wheel 30 adjusted and preset by the driver. For example, the steering wheel information can include a tilt angle and a height of the steering wheel 30. The steering angle information indicates a steering angle of the vehicle, i.e., rotation angle of the steering wheel 30. According to the first embodiment, when the vehicle travels in a straight line, the steering angle is shown as 0 degree, when the steering wheel 30 is turned to the right, the steering angle is shown as a positive value, and when the steering wheel 30 is turned to the left, the steering angle is shown as a negative value.

The display control apparatus 10 further includes a display controller 13 for performing the overall control of the display control apparatus 10. The display controller 13 outputs an image signal to the meter display unit 20, thereby causing the meter display unit 20 to display an image corresponding to the image signal. For example, the display controller 13 can include a central processing unit (CPU), a read only memory (ROM), and a random access memory (RAM).

The display control apparatus 10 further includes an on-board apparatus controller 14 and a vehicle information detector 15. The on-board apparatus controller 14 communicates with the on-board apparatus through the in-vehicle LAN. The on-board apparatus controller 14 sends commands to the on-board apparatus and acquires vehicle information of the vehicle from the on-board apparatus. The vehicle information detector 15 acquires vehicle information of the vehicle from the sensors.

Figure 2:
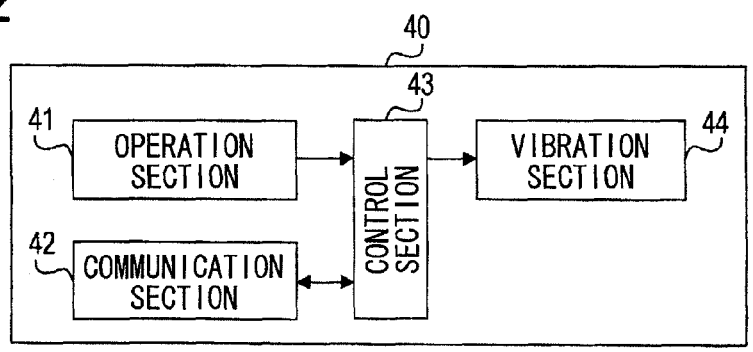
FIG. 2 is a block diagram of a touch pad according to the first embodiment.

As shown in FIG. 2, each touch pad 40 includes an operation section 41, a communication section 42, a control section 43, and a vibration section 44. The operation section 41 has a flat operation surface responsive to a touch operation of a user. The communication section 42 communicates with the display control apparatus 10. The control section 43 performs the overall control of the touch pad 40. For example, the control section 43 can include a CPU, a ROM, and a RAM. The vibration section 44 produces vibration on the operation surface of the operation section 41.

The control section 43 periodically generates the operation information that indicates presence or absence of the touch operation to the operation surface of the operation section 41 and a position of the touch operation on the operation surface of the operation section 41. The control section 43 sends the operation information through the communication section 42 to the display control apparatus 10.

When acquiring the operation information from the touch pad 40, the display controller 13 of the display control apparatus 10 performs various processes according to the operation information. Further, at this time, the display controller 13 can send the operation information to the on-board apparatus as necessary. Thus, the driver can operate the display control apparatus 10 and the on-board apparatus through the touch pad 40.

Next, a function of the display control apparatus 10 is explained with reference to FIGS. 3A, 3B, and 3C.

Figure 3A:
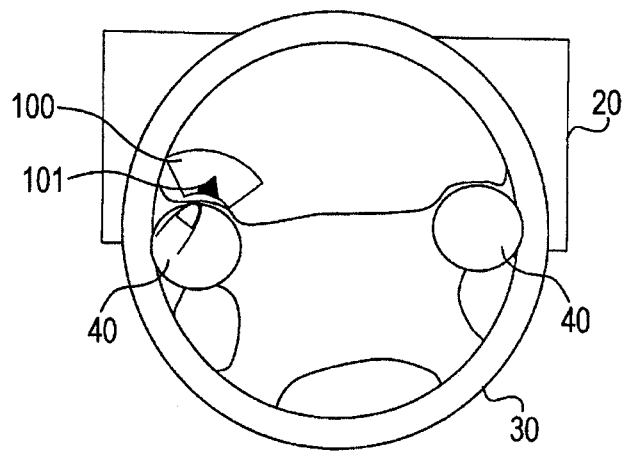
FIGS. 3A, 3B, and 3C are diagrams illustrating a change in a display position of an operation image with a rotation of a steering wheel.
Figure 3B:
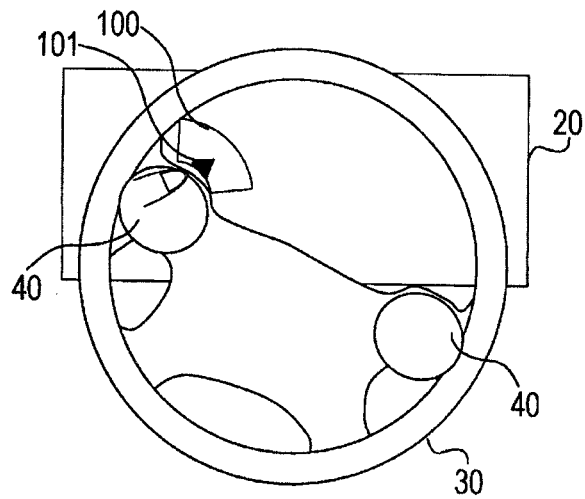
Figure 3C:
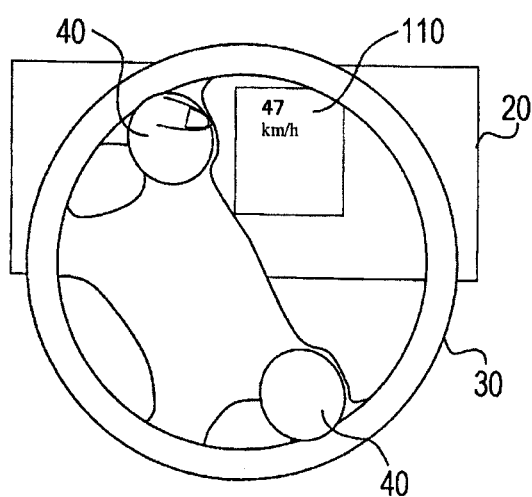

As shown in FIG. 3A, when the display control apparatus 10 detects the touch operation on the touch pad 40, the display control apparatus 10 displays an operation image 100 on the screen of the meter display unit 20. The operation image 100 varies according to the type of the detected touch operation. In an example shown in FIG. 3A, the operation image 100 has a cursor 101. When a finger of the driver moves on the operation surface of the touch pad 40, the cursor 101 moves according to a direction of movement of the finger.

Figure 4:
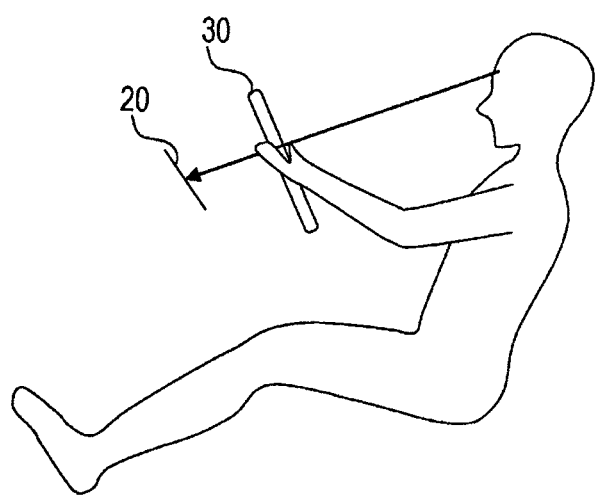
FIG. 4 is a diagram illustrating a method of determining the display position of the operation image.

The operation image 100 is displayed on the meter display unit 20 for each touch pad 40. That is, when both of the touch pads 40 are touched by the driver, two operation images 100 are displayed on the meter display unit 20. A position of each operation image 100 is adjusted so that the driver can view the operation image 100 at a position adjacent to a corresponding touch pad 40. Specifically, as shown in FIG. 4, an intersection between the screen of the meter display unit 20 and an extension of line of sight from the view point of the driver to the corresponding touch pad 40 is calculated, and the position of the operation image 100 on the screen is adjusted based on a position of the calculated intersection.

A position of the touch pad 40 changes with rotation (i.e., turn) of the steering wheel 30. As shown in FIG. 3B, the display control apparatus 10 changes the position of the operation image 100 on the screen according to the rotation of the steering wheel 30 so that the driver can always view the operation image 100 at the position adjacent to the corresponding touch pad 40.

Laws in some countries or states oblige car manufacturers to design the meter display unit 20 so that the meter display unit 20 can display specific information such as the speed of the vehicle. Further, there is information that is preferable to be displayed on the meter display unit 20 in consideration of convenience and safety of driving. Such information is hereinafter collectively referred to as the "important information". The display control apparatus 10 displays the important information on the meter display unit 20 in preference to the operation image 100. Specifically, if the display control apparatus 10 determines that a display region of the operation image 100 overlaps a display region 110 of the important information when the position of the operation image 100 is changed according to the rotation of the steering wheel 30, the display control apparatus 10 deletes the operation image 100 from the screen of the meter display unit 20. The display region of the operation image 100 is a region of the screen to display the operation image 100, and the display region 110 of the important information is a region of the screen to display the important information.

Figure 5:
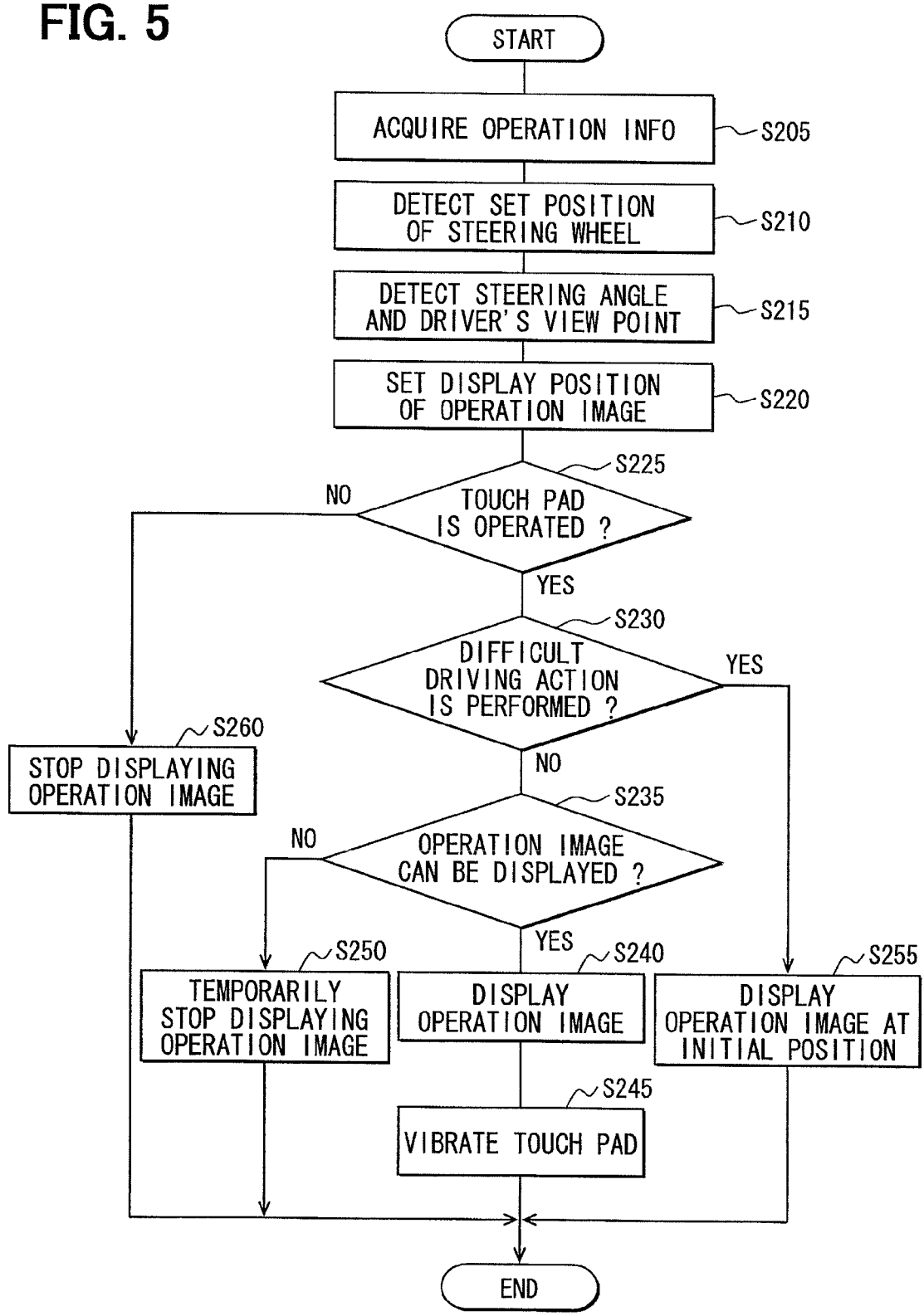
FIG. 5 is a flow chart of an operation image display process performed by the display control apparatus.

FIG. 5 is a flow chart of an operation image display process performed by the display control apparatus 10 to display the operation image 100 on the screen of the meter display unit 20 according to the touch operation on the touch pad 40 and to change the position of the operation image 100 on the screen according to the rotation of the steering wheel 30.

The display control apparatus 10 performs the operation image display process at a regular time interval (e.g., 100 ms) during driving of the vehicle. The operation image display process is performed for each touch pad 40. According to the first embodiment, since the display control apparatus 10 receives inputs from two touch pads 40, the display control apparatus 10 performs the operation image display process twice within the time interval.

The operation image display process starts at S205, where the display controller 13 of the display control apparatus 10 acquires the operation information from the corresponding touch pad 40 through the operation information detector 11. Then, the operation image display process proceeds to S210, where the display controller 13 acquires the steering wheel information (i.e., the set position of the steering wheel 30) through the steering information detector 12.

Then, the operation image display process proceeds to S215, where the display controller 13 acquires the steering angle information (i.e., the steering angle of the vehicle) through the steering information detector 12. Further, at S215, the display controller 13 acquires the view point of the driver from the view point detector 50.

Then, the operation image display process proceeds to S220, where the display controller 13 sets a display position of the operation image 100 to be displayed on the screen of the meter display unit 20. Specifically, at S220, based on the set position of the steering wheel 30, the steering angle of the vehicle, and the view point of the driver, the display controller 13 calculates an intersection between the screen of the meter display unit 20 and an extension of line of sight from the view point of the driver to the center of the operation surface of the touch pad 40.

Then, based on the calculated intersection, a shape of the touch pad 40, and a shape of the steering wheel 30, the display controller 13 identifies a reference region and an invisible region of the screen of the meter display unit 20. The reference region is a region hidden behind the touch pad 40 when the driver views the screen of the meter display unit 20. The invisible region is a region hidden behind a spoke and a column of the steering wheel 30 when the driver views the screen of the meter display unit 20. Then, the display controller 13 identifies a display region that is located along an outer edge of the reference region and does not overlap the invisible region. Then, the display controller 13 sets the identified display region as the display position of the operation image 100. Thus, at S220, the display controller 13 sets the display position interlocked with the steering angle to display the operation image 100. The display position of the operation image 100 is hereinafter sometimes referred to as the "steering angle interlocked position".

Then, the operation image display process proceeds to S225, where the display controller 13 determines whether the touch operation to the touch pad 40 is performed based on the operation information acquired at S205. If the display controller 13 determines that the touch operation to the touch pad 40 is performed corresponding to YES at S225, the operation image display process proceeds to S230. In contrast, if the display controller 13 does not determine that the touch operation to the touch pad 40 is performed corresponding to NO at S225, the operation image display process proceeds to S260.

At S260, the display controller 13 stops displaying the operation image 100 on the meter display unit 20, if the operation image 100 remains displayed on the meter display unit 20. Alternatively, the display controller 13 can stop displaying the operation image 100 on the meter display unit 20 when a predetermine time period (e.g., five minutes) elapses after the touch operation to the touch pad 40 becomes undetected. After S260, the operation image display process is ended.

In contrast, at S230, the display controller 13 determines whether the driver is now performing a difficult driving action. Specifically, at S230, the display controller 13 determines whether a predetermined driving condition is satisfied based on the steering angle and the vehicle information acquired through the vehicle information detector 15. For example, the satisfaction of the driving condition can indicate occurrence of sudden steering, sudden braking, and sudden acceleration. For example, the vehicle information can indicate acceleration of the vehicle and an operation state of a brake of the vehicle. If the display controller 13 determines that the driver is now performing the difficult driving action corresponding to YES at S230, the display controller 13 proceeds to S255. In contrast, if the display controller 13 does not determine that the driver is now performing a difficult driving action corresponding to NO at S230, the display controller 13 proceeds to S235.

At S255, the display controller 13 displays the operation image 100 at an initial position on the screen of the meter display unit 20, if the operation image 100 remains displayed on the meter display unit 20. The initial position is the steering angle interlocked position when the steering angle is 0 degree. Alternatively, in the event of sudden braking, the display controller 13 can display the operation image 100 at the steering angle interlocked position that appears immediately before occurrence of sudden braking. Alternatively, in the event of sudden braking, the display controller 13 can temporarily stop displaying the operation image 100 on the meter display unit 20. In these alternate cases, the display controller 13 can disable the operation information acquired during a period of time when the display controller 13 displays the operation image 100 at the initial position, displays the operation image 100 at the steering angle interlocked position appearing immediately before occurrence of sudden braking, or temporarily stops displaying the operation image 100. The display controller 13 does not perform the processes based on the disabled operation information. After S255, the operation image display process is ended.

In contrast, at S235, the display controller 13 determines whether the operation image 100 can be displayed at the steering angle interlocked position based on the steering angle. Specifically, if the display controller 13 determines that the operation image 100 overlaps the display region 110 of the important information when the operation image 100 is displayed at the steering angle interlocked position, the display controller 13 determines that the operation image 100 cannot be displayed at the steering angle interlocked position. In contrast, if the display controller 13 determines that the operation image 100 does not overlap the display region 110 of the important information when the operation image 100 is displayed at the steering angle interlocked position, the display controller 13 determines that the operation image 100 can be displayed at the steering angle interlocked position.

It is noted that the steering angle interlocked position returns to the initial position when the steering wheel 30 rotates one turn. Therefore, the driver may incorrectly recognize the steering angle based on the display position of the operation image 100. According to the first embodiment, to avoid this disadvantage, if the steering angle is not less than plus 180 degrees or not greater than minus 180 degrees, the display controller 13 does not determine that the operation image 100 can be displayed at the steering angle interlocked position, and if the steering angle is greater than minus 180 degrees and less than plus 180 degrees, the display controller 13 determines that the operation image 100 can be displayed at the steering angle interlocked position. In such an approach, only when the display controller 13 determines that the operation image 100 does not overlap the display region 110 of the important information and that the steering angle is greater than minus 180 degrees and less than plus 180 degrees, the display controller 13 determines that the operation image 100 can be displayed at the steering angle interlocked position.

If the display controller 13 does not determine that the operation image 100 can be displayed at the steering angle interlocked position corresponding to NO at S235, the operation image display process proceeds to S250. In contrast, if the display controller 13 determines that the operation image 100 can be displayed at the steering angle interlocked position corresponding to YES at S235, the operation image display process proceeds to S240.

At S250, the display controller 13 temporarily stops displaying the operation image 100 on the meter display unit 20. At this time, the display controller 13 can disable the operation information acquired during a period of time when the display controller 13 temporarily stops displaying the operation image 100. The display controller 13 does not perform the processes based on the disabled operation information.

At S240, the display controller 13 generates the operation image 100 based on the operation information acquired from the touch pad 40 and displays the operation image 100 at the steering angle interlocked position on the meter display unit 20, if the operation image 100 remains undisplayed. In contrast, if the operation image 100 remains displayed, the display controller 13 updates the operation image 100 based on the operation information acquired from the touch pad 40 and also updates the display position of the operation image 100 to the latest steering angle interlocked position.

When the display controller 13 restarts displaying the operation image 100 after temporally stopping displaying the operation image 100 (e.g., when the operation image display process proceeds to S240 for the first time after the display controller 13 temporally stops displaying the operation image 100 at S250 or S255), the display controller 13 can display the same operation image 100 that the display controller 13 temporally stops displaying.

After S240, the operation image display process proceeds to S245, where the display controller 13 communicates with the touch pad 40 through the operation information detector 11. Then, the display controller 13 outputs a vibration command to the touch pad 40 according to the operation information received from the touch pad 40, the content of the operation image 100, and the content of the process performed based on the operation information. In the touch pad 40, the vibration section 44 generates vibration on the operation surface according to the vibration command. After S245, the operation image display process is ended.

Figure 6:
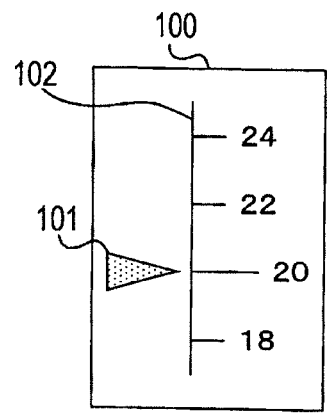
FIG. 6 is a diagram illustrating an example of the operation image displayed when a temperature inside a vehicle is set by using the touch pad.

One concrete example of the vibration command is as follows. Here, it is assumed that the operation image 100 shown in FIG. 6 is displayed on the meter display unit 20 when the driver sets a temperature inside the vehicle by using the touch pad 40. The operation image 100 includes a cursor 101 and a temperature range image 102. The cursor 101 indicates the current set temperature. The temperature range image 102 indicates a temperature settable range within which the temperature can be set. Further, it is assumed that the set temperature changes in steps of 0.5 degrees according to the operation to the touch pad 40 and that the cursor 101 moves up and down with the change in the set temperature. In this case, the display controller 13 can vibrate the touch pad 40 each time the current set temperature changes to positions corresponding to marks on the temperature range image 102.

An operation image similar to that shown in FIG. 6 can be displayed on the meter display unit 20, for example, when the driver sets a volume of an audio device or a degree of opening of a window. In this case, the display controller 13 can vibrate the touch pad 40 each time the set value changes to predetermined threshold values.

Further, the display controller 13 can vibrate the touch pad 40 when the operation image 100 starts to be displayed on the meter display unit 20. Further, the display controller 13 can vibrate the touch pad 40 each time the operation image 100 displayed on the meter display device is updated according to a predetermined operation to the touch pad 40.

(Second Embodiment)

A second embodiment of the present disclosure is described below. A difference of the second embodiment from the first embodiment is as follows.

Although, the structure of the display control apparatus 10 is the same between the first embodiment and the second embodiment, the structure of the touch pad 40 is different between the first embodiment and the second embodiment.

Figure 7:
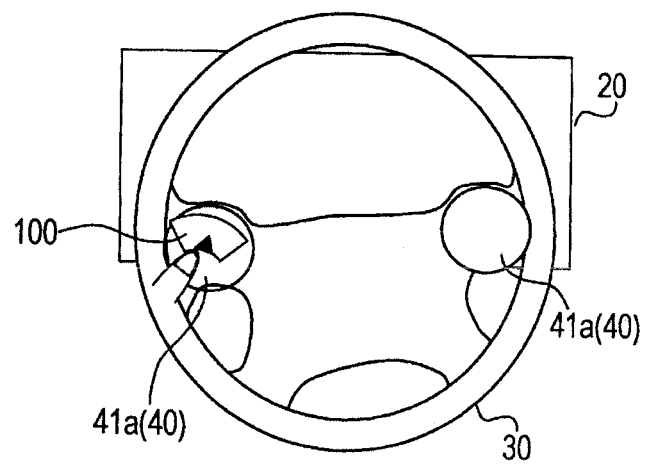
FIG. 7 is a diagram illustrating a display position of an operation image displayed by a display control apparatus according to a second embodiment of the present disclosure.

As shown in FIG. 7, according to the second embodiment, the touch pad 40 is mounted on the steering wheel 30 and has a transparent operation section 41. The driver can view the screen of the meter display unit 20 through a transparent operation surface 41a of the operation section 41.

Like in the first embodiment, the display control apparatus 10 displays the operation image 100 on the screen of the meter display unit 20 according to the operation to each touch pad 40 and also changes the position of the operation image 100 on the screen according to the rotation of the steering wheel 30. Unlike in the first embodiment, a position of each operation image 100 is adjusted so that the driver can view the operation image 100 through the operation surface 41a of the corresponding touch pad 40. That is, the position of each operation image 100 is adjusted so that the operation image 100 can overlap the operation surface 41a when viewed from the driver.

A difference of the operation image display process between the first embodiment and the second embodiment is as follows.

According to the second embodiment, at S220, based on the set position of the steering wheel 30, the steering angle of the vehicle, and the view point of the driver, the display controller 13 calculates an intersection between the screen of the meter display unit 20 and an extension of line of sight from the view point of the driver to the center of the operation surface 41a of the touch pad 40.

Then, based on the calculated intersection, the shape of the touch pad 40, and the shape of the steering wheel 30, the display controller 13 identifies a reference region of the screen of the meter display unit 20. The reference region is a region hidden behind the operation surface 41a of the touch pad 40 when the driver views the screen of the meter display unit 20. Then, the display controller 13 sets the steering angle interlocked position on the reference region.

(Advantages)

According to the first embodiment, even when the steering wheel 30 is turned or rotated, the display control apparatus 10 displays the operation image 100 on the screen of the meter display unit 20 so that the driver can view the operation image 100 at the position adjacent to the corresponding touch pad 40. Thus, the driver can accurately recognize the position of the touch pad 40 simply by glancing at the operation image 100. In this way, the driver can recognize the positional relationship between his/or her finger and the touch pad 40 without looking at the operation image 100 and the touch pad 40 separately or without updating the operation image 100 by actually operating the touch pad 40. Therefore, the driver can intuitively operate the touch pad 40.

According to the second embodiment, even when the steering wheel 30 is turned or rotated, the display control apparatus 10 displays the operation image 100 on the screen of the meter display unit 20 so that the driver can view the operation image 100 through the transparent operation surface 41a of the corresponding touch pad 40. Thus, the driver can view the operation image 100 and the touch pad 40 at the same time. In this way, the driver can accurately recognize the type of the operation to the touch pad 40 performed by him or herself simply by glancing at the touch pad 40 without looking at the operation image 100 and the touch pad 40 separately. Therefore, the driver can intuitively operate the touch pad 40.

According to the first and second embodiments, the display position of the operation image 100 (i.e., steering angle interlocked position) is determined based on the view point of the driver and the set position of the steering wheel 30. In such an approach, the display control apparatus 10 can accurately display the operation image 100 on the screen of the meter display unit 20 so that the driver can view the operation image 100 at the position adjacent to the touch pad 40 or so that the driver can view the operation image 100 through the transparent operation surface 41a of the touch pad 40. Alternatively, the steering angle interlocked position can be determined without consideration of the set position of the steering wheel 30 to reduce processing load.

Further, according to the first and second embodiments, the display control apparatus 10 displays the operation image 100 on the screen of the meter display unit 20 only during a period of time when the corresponding touch pad 40 is being operated. In such an approach, unnecessary display of the operation image 100 can be prevented so that usability can be improved. Alternatively, the operation image 100 can be displayed regardless of presence or absence of the operation to the touch pad 40.

Further, when the operation image 100 is displayed or updated, the display control apparatus 10 vibrates the corresponding touch pad 40 according to the content of the operation image 100. In such an approach, the driver can easily recognize the content of the operation to the touch pad 40 performed by him or herself. Thus, togetherness between the operation image 100 and the operation to the touch pad 40 is increased so that the driver can intuitively operate the touch pad 40.

Further, in the event of sudden steering or the like, the display control apparatus 10 displays the operation image 100 at a fixed position (e.g., initial position) on the meter display unit 20 or temporarily stops displaying the operation image 100. That is, the display control apparatus 10 temporarily stops changing the position of the operation image 100 according to the rotation of the steering wheel 30. In such an approach, the driver can concentrate on driving the vehicle when the driver performs a difficult driving action.

Further, if the operation image 100 overlaps the display region 110 of the important information when the operation image 100 is displayed at the steering angle interlocked position, the display control apparatus 10 temporarily stops displaying the operation image 100. In such an approach, the driver can surely view the important information and drive the vehicle based on the important information.

Further, if the steering angle is not less than plus 180 degrees or not greater than minus 180 degrees, the display control apparatus 10 temporarily stops displaying the operation image 100. In such an approach, even when the steering wheel 30 rotates more than one turn, there is no possibility that the driver inaccurately recognizes the steering angle of the vehicle based on the display position of the operation image 100.

Further, the display control apparatus 10 disables the operation information acquired during a period of time when the display control apparatus 10 temporarily stops displaying the operation image 100. In such an approach, it is possible to prevent the display control apparatus 10 from incorrectly performing the processes based on the operation information acquired during a period of time when the display control apparatus 10 temporarily stops displaying the operation image 100.

Further, when the display control apparatus 10 restarts displaying the operation image 100 after temporally stopping displaying the operation image 100, the display control apparatus 10 displays the same operation image 100 as the display controller 13 temporarily stops displaying. In such an approach, the driver can smoothly restart the operation to the touch pad 40.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

(1) In the first and second embodiments, the view point detector 50 detects the view point of the driver based on the image captured by the camera 51. Alternatively, the view point detector 50 can detect the view point of the driver based on the height of the driver's seat and/or the angle of the seat back of the driver's seat. Alternatively, the view point detector 50 can receive an input from the driver and detect the view point of the driver based on the input. For example, the input can be the height of the driver or the view point of the driver.

Alternatively, to reduce processing load, the display position of the operation image 100 (i.e., steering angle interlocked position) can be determined by assuming that the view point of the driver is a fixed value.

(2) In the first and second embodiments, two touch pads 40 are mounted on the steering wheel 30. The number of the touch pads 40 mounted on the steering wheel 30 is not limited to two.

Instead of or in addition to the touch pad 40, another operation unit such as a bottom and/or a lever can be mounted on the steering wheel 30. In this case, the display control apparatus 10 can display an operation image on the meter display unit 20 according to an operation to the other operation unit.

(3) In the first embodiment, the display control apparatus 10 can display the operation image 100 for the left touch pad 40 at the steering angle interlocked position when the steering angle falls in a range from about minus 10 degrees to about plus 170 degrees, and the display control apparatus 10 can display the operation image 100 for the right touch pad 40 at the steering angle interlocked position when the steering angle falls in a range from about minus 170 degrees to about plus 10 degrees.

In the second embodiment, the display control apparatus 10 can display the operation image 100 for the left touch pad 40 at the steering angle interlocked position when the steering angle falls in a range from about 0 degree to about plus 180 degrees, and the display control apparatus 10 can display the operation image 100 for the right touch pad 40 at the steering angle interlocked position when the steering angle falls in a range from about minus 180 degrees to about 0 degree.

The range of the steering angle for allowing the display control apparatus 10 to display the operation image 100 at the steering angle interlocked position is not limited to the above-mentioned range. The range can be determined based on the shape and position of the screen of the meter display unit 20 and the shape and position of the steering wheel 30.

In the first embodiment, the steering angle interlocked position may become the same between when the steering angle falls in a first range from minus 170 degrees to plus 170 degrees, in a second range from plus 350 degrees to plus 530 degrees, and in a third range from minus 530 degrees to minus 350 degrees. As a result, the display control apparatus 10 may display the operation image 100 at the same display position. The steering angle falls in the second range or the third range, when the steering wheel 30 rotates more than one turn.

In the second embodiment, the steering angle interlocked position may become the same between when the steering angle falls in a fourth range from minus 180 degrees to plus 180 degrees, in a fifth range from plus 360 degrees to plus 540 degrees, and in a sixth range from minus 540 degrees to minus 360 degrees. As a result, the display control apparatus 10 may display the operation image 100 at the same display position. The steering angle falls in the fifth range or the sixth range, when the steering wheel 30 rotates more than one turn.

For the above reasons, in the operation image display process according to the first and second embodiments, the display control apparatus 10 temporally stops displaying the operation image 100 if the steering angle is not less than plus 180 degrees or not greater than minus 180 degrees. However, as described above, the range of the steering angle for allowing the display control apparatus 10 to display the operation image 100 at the steering angle interlocked position can vary depending on the shape and position of the screen of the meter display unit 20. Therefore, a threshold of the steering angle for causing the display control apparatus 10 to temporally stop displaying the operation image 100 is not limited to plus 180 degrees or minus 180 degrees and can be set according to the range of the steering angle for allowing the display control apparatus 10 to display the operation image 100 at the steering angle interlocked position.

For example, when the range of the steering angle for allowing the display control apparatus 10 to display the operation image 100 at the steering angle interlocked position is from plus 30 degrees to plus 150 degrees, the threshold can be plus 210 degrees or minus 210 degrees. For another example, when the range of the steering angle for allowing the display control apparatus 10 to display the operation image 100 at the steering angle interlocked position is from minus 90 degrees to plus 270 degrees, the threshold can be minus 90 degrees or plus 90 degrees.

Correspondences between termed used in the embodiments and claims are as follows.

The meter display unit 20 corresponds to a display unit. The touch pad 40 corresponds to an operation unit.

The vibration section 44 of the touch pad 40 corresponds to a vibrator. The on-board apparatus controller 14 and the vehicle information detector 15 correspond to a driving state detector.

The display controller 13 can act as an operation detector by performing S205 of the operation image display process. The display controller 13 can act as a steering wheel position detector by performing S210 of the operation image display process. The display controller 13 can act as a steering angel detector and a view point detector by performing S215 of the operation image display process. The display controller 13 can act as a setting section by performing S220 of the operation image display process. The display controller 13 can act as a condition determining section by performing S230 of the operation image display process. The display controller 13 can act as an angle determining section by performing S235 of the operation image display process. The display controller 13 can act as a display section by performing S240 of the operation image display process. The display controller 13 can act as a vibration controller by performing S245 of the operation image display process. The display controller 13 can act as the display section and a disabling section by performing S250 of the operation image display process. The display controller 13 can act as the display section, the disabling section, and the setting section by performing S255 of the operation image display process. The display controller 13 can act as the display section by performing S260 of the operation image display process.

What is claimed is:

1. A display control apparatus for a vehicle comprising:
    a steering angle detector configured to detect a steering angle of the vehicle;
    an operation detector configured to detect an operation to an operation unit mounted on a steering wheel of the vehicle;
    a display section configured to display an operation image on a display unit located behind the steering wheel in such a manner that the operation image changes according to the operation detected by the operation detector; and
    a setting section configured to set a display position of the operation image on the display unit according to the steering angle detected by the steering angle detector so that a driver of the vehicle views the operation image at a position adjacent to the operation unit.

2. The display control apparatus according to claim 1, wherein
    the display section starts displaying the operation image when the operation becomes detected by the operation detector, and
    the display section stops displaying the operation image when the operation becomes undetected by the operation detector.

3. The display control apparatus according to claim 1, further comprising:
    a view point detector configured to detect a view point of the driver, wherein
    the setting section sets the display position of the operation image according to the view point detected by the view point detector.

4. The display control apparatus according to claim 1, further comprising:
    a steering wheel position detector configured to detect a set position of the steering wheel set by the driver, wherein
    the setting section sets the display position of the operation image according to the set position of the steering wheel detected by the steering wheel position detector.

5. The display control apparatus according to claim 1, further comprising:
    a vibration controller configured to activate a vibrator of the operation unit according to a change in the operation image.

6. The display control apparatus according to claim 1, further comprising:
    a driving state detector configured to detect a driving state of the vehicle;

a condition determining section configured to determine whether a predetermined driving condition is satisfied based on the driving state detected by the driving state detector, wherein when the condition determining section determines that the driving condition is satisfied, the setting section sets the display position of the operation image to a predetermined fixed position regardless of the steering angle detected by the steering angle detector.

7. The display control apparatus according to claim 1, further comprising:

a driving state detector configured to detect a driving state of the vehicle;

a condition determining section configured to determine whether a predetermined driving condition is satisfied based on the driving state detected by the driving state detector, wherein when the condition determining section determines that the driving condition is satisfied, the display section temporally stops displaying the operation image.

8. The display control apparatus according to claim 1, wherein the display section determines whether a display region of the operation image on the display unit overlaps a display region of a predetermined image that remains displayed on the display unit, and when the display section determines that the display region of the operation image overlaps the display region of the predetermined image, the display section temporally stops displaying the operation image.

9. The display control apparatus according to claim 1, further comprising:

an angle determining section configured to determine whether a rotation angle of the steering wheel reaches a predetermined angle based on the steering angle detected by the steering angle detector with reference to when the steering angle is zero degree, wherein when the angle determining section determines that the rotation angle of the steering wheel reaches the predetermined angle, the display section temporally stops displaying the operation image.

10. The display control apparatus according to claim 7, further comprising:

a disabling section configured to disable the operation to the operation unit during a period of time when the display section temporally stops displaying the operation image.

11. The display control apparatus according to claim 7, wherein when the display section restarts displaying the operation image, the display section uses the same operation image that the display section temporally stopping display.

12. A display control apparatus for a vehicle comprising:

a steering angle detector configured to detect a steering angle of the vehicle;

an operation detector configured to detect an operation to an operation unit mounted on a steering wheel of the vehicle, the operating unit having a transparent portion through which a driver of the vehicle views a display unit located behind the steering wheel;

a display section configured to display an operation image on the display unit in such a manner that the operation image changes according to the operation detected by the operation detector; and a setting section configured to set a display position of the operation image on the display unit according to the steering angle detected by the steering angle detector so that the driver views the operation image through the transparent portion of the display unit.

13. The display control apparatus according to claim 12, wherein the display section starts displaying the operation image when the operation becomes detected by the operation detector, and the display section stops displaying the operation image when the operation becomes undetected by the operation detector.

14. The display control apparatus according to claim 12, further comprising:

a view point detector configured to detect a view point of the driver, wherein the setting section sets the display position of the operation image according to the view point detected by the view point detector.

15. The display control apparatus according to claim 12, further comprising:

a steering wheel position detector configured to detect a set position of the steering wheel set by the driver, wherein the setting section sets the display position of the operation image according to the set position of the steering wheel detected by the steering wheel position detector.

16. The display control apparatus according to claim 12, further comprising:

a vibration controller configured to activate a vibrator of the operation unit according to a change in the operation image.

17. The display control apparatus according to claim 12, further comprising:

a driving state detector configured to detect a driving state of the vehicle;

a condition determining section configured to determine whether a predetermined driving condition is satisfied based on the driving state detected by the driving state detector, wherein when the condition determining section determines that the driving condition is satisfied, the setting section sets the display position of the operation image to a predetermined fixed position regardless of the steering angle detected by the steering angle detector.

18. The display control apparatus according to claim 12, further comprising:

a driving state detector configured to detect a driving state of the vehicle;

a condition determining section configured to determine whether a predetermined driving condition is satisfied based on the driving state detected by the driving state detector, wherein when the condition determining section determines that the driving condition is satisfied, the display section temporally stops displaying the operation image.

19. The display control apparatus according to claim 12, wherein the display section determines whether a display region of the operation image on the display unit overlaps a display region of a predetermined image that remains displayed on the display unit, and when the display section determines that the display region of the operation image overlaps the display region of the predetermined image, the display section temporally stops displaying the operation image.

20. The display control apparatus according to claim 12, further comprising:

an angle determining section configured to determine whether a rotation angle of the steering wheel reaches a predetermined angle based on the steering angle detected by the steering angle detector with reference to when the steering angle is zero degree, wherein when the angle determining section determines that the rotation angle of the steering wheel reaches the predetermined angle, the display section temporally stops displaying the operation image.

21. The display control apparatus according to claim 18, further comprising:

a disabling section configured to disable the operation to the operation unit during a period of time when the display section temporally stops displaying the operation image.

22. The display control apparatus according to claim 18, wherein when the display section restarts displaying the operation image, the display section uses the same operation image that the display section temporally stopping display.

\* \* \* \* \*